US011890649B2

(12) United States Patent
Bombaugh

(10) Patent No.: US 11,890,649 B2
(45) Date of Patent: Feb. 6, 2024

(54) SYSTEM AND METHOD OF SORTING AND SEQUENCING ITEMS

(71) Applicant: United States Postal Service, Washington, DC (US)

(72) Inventor: Scott R. Bombaugh, Burke, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/804,444

(22) Filed: May 27, 2022

(65) Prior Publication Data

US 2022/0362810 A1 Nov. 17, 2022

Related U.S. Application Data

(60) Continuation of application No. 16/872,895, filed on May 12, 2020, now Pat. No. 11,344,918, which is a continuation of application No. 16/252,445, filed on Jan. 18, 2019, now Pat. No. 10,668,505, which is a continuation of application No. 15/727,866, filed on Oct. 9, 2017, now Pat. No. 10,220,416, which is a
(Continued)

(51) Int. Cl.

| | |
|---|---|
| ***B07C 3/02*** | (2006.01) |
| ***B07C 3/08*** | (2006.01) |
| ***B07C 1/02*** | (2006.01) |
| ***B07C 3/14*** | (2006.01) |

(52) U.S. Cl.
CPC ................ *B07C 3/02* (2013.01); *B07C 1/025* (2013.01); *B07C 3/08* (2013.01); *B07C 3/14* (2013.01)

(58) Field of Classification Search
CPC ........... B07C 1/025; B07C 1/04; B07C 3/008; B07C 3/06; B07C 3/08; B07C 2301/0041
See application file for complete search history.

(56) References Cited

U.S. PATENT DOCUMENTS

| | | | |
|---|---|---|---|
| 4,244,672 | A | 1/1981 | Lund |
| 4,388,994 | A | 6/1983 | Suda et al. |
| 5,277,321 | A | 1/1994 | Nagasawa et al. |

(Continued)

FOREIGN PATENT DOCUMENTS

| | | | |
|---|---|---|---|
| DE | 10 200 022 082 | A1 | 12/2010 |
| EP | 0 661 106 | A2 | 7/1995 |

(Continued)

OTHER PUBLICATIONS

International Search Report and Written Opinion from the International Searching Authority dated Apr. 21, 2016 for International Application No. PCT/US2015/060724.

(Continued)

*Primary Examiner* — Joseph C Rodriguez
(74) *Attorney, Agent, or Firm* — Knobbe, Martens, Olson & Bear, LLP

(57) ABSTRACT

Embodiments of a system and method for sorting and sequencing articles in a processing facility are disclosed. Delivery endpoints are divided and grouped into stop groups. A first sorter sorts items according to stop group and outputs the items to trays. The output trays from the first sorter are loaded to a second sorter in stop group order. The second sorter sorts items for each stop group into separate lanes. Each lane can then be sorted into output bins in delivery sequence order.

20 Claims, 4 Drawing Sheets

Related U.S. Application Data division of application No. 14/941,373, filed on Nov. 13, 2015, now Pat. No. 9,849,487.

(60) Provisional application No. 62/079,407, filed on Nov. 13, 2014.

(56) References Cited

U.S. PATENT DOCUMENTS

| | | | | |
|---|---|---|---|---|
| 5,363,971 | A | 11/1994 | Weeks et al. | |
| 5,385,243 | A | 1/1995 | Jackson et al. | |
| 5,433,325 | A | 7/1995 | Levaro et al. | |
| 5,542,547 | A | 8/1996 | Ricciardi | |
| 5,718,321 | A | 2/1998 | Brugger et al. | |
| 5,901,855 | A | 5/1999 | Uno et al. | |
| 5,908,116 | A | 6/1999 | Levaro et al. | |
| 6,082,521 | A | 7/2000 | Maier et al. | |
| 6,208,910 | B1 | 3/2001 | Michael et al. | |
| 6,321,992 | B1 | 11/2001 | Knowles et al. | |
| 6,366,828 | B1 | 4/2002 | De Leo et al. | |
| 6,533,271 | B1 | 3/2003 | Zimmermann | |
| 6,576,857 | B1 | 6/2003 | De Leo et al. | |
| 6,677,548 | B2 | 1/2004 | Robu et al. | |
| 6,786,404 | B1 | 9/2004 | Bonner et al. | |
| 6,822,182 | B2 | 11/2004 | Kechel | |
| 6,881,916 | B2 | 4/2005 | McLaughlin et al. | |
| 6,978,192 | B2 | 12/2005 | Wisniewski | |
| 7,138,596 | B2 | 11/2006 | Pippin et al. | |
| 7,227,094 | B2 | 6/2007 | Oexle et al. | |
| 7,259,345 | B2 | 8/2007 | Kechel | |
| 7,278,568 | B2 | 10/2007 | Kadaba | |
| 7,683,283 | B2 | 3/2010 | Hanson et al. | |
| 7,845,484 | B2 | 12/2010 | Zimmermann | |
| 7,982,156 | B2 | 7/2011 | Burns et al. | |
| 8,024,063 | B2 | 9/2011 | Redford et al. | |
| 8,178,811 | B2 | 5/2012 | Berdelle-Hilge | |
| 8,269,125 | B2 * | 9/2012 | Roth | B07C 3/00 209/583 |
| 8,326,450 | B2 | 12/2012 | Stemmle | |
| 8,369,985 | B2 | 2/2013 | Stemmle | |
| 8,374,720 | B2 | 2/2013 | Kechel | |
| 8,457,781 | B2 | 6/2013 | Bailey et al. | |
| 8,583,278 | B2 | 11/2013 | Bretschneider | |
| 8,608,068 | B2 | 12/2013 | Carpenter | |
| 8,731,707 | B2 | 5/2014 | Stemmle | |
| 8,748,768 | B2 | 6/2014 | Bowers | |
| 8,766,128 | B2 | 7/2014 | Stemmle | |
| 8,772,664 | B2 | 7/2014 | Zimmerman | |
| 8,827,065 | B2 | 9/2014 | Enenkel | |
| 8,965,566 | B2 | 2/2015 | Berdelle-Hilge | |
| 8,983,648 | B2 * | 3/2015 | Kreitmeier | B07C 3/00 700/226 |
| 8,997,971 | B2 | 4/2015 | Agier et al. | |
| 9,020,634 | B2 | 4/2015 | Bailey et al. | |
| 9,108,225 | B2 | 8/2015 | Cartal et al. | |
| 9,156,063 | B2 | 10/2015 | Bowers et al. | |
| 9,205,461 | B2 | 12/2015 | Norris et al. | |
| 9,278,376 | B2 | 3/2016 | McLaughlin et al. | |
| 9,314,822 | B2 | 4/2016 | Berdelle-Hilge | |
| 9,321,083 | B2 | 4/2016 | Volta et al. | |
| 9,415,422 | B2 | 8/2016 | Worth, II et al. | |
| 9,415,423 | B2 | 8/2016 | Wilson | |
| 9,481,016 | B2 | 11/2016 | Brown et al. | |
| 9,845,194 | B2 | 12/2017 | Chirol et al. | |
| 9,849,487 | B2 | 12/2017 | Bombaugh | |
| 10,220,416 | B2 | 3/2019 | Bombaugh | |
| 10,369,597 | B2 | 8/2019 | Farlotti | |
| 10,717,112 | B2 | 7/2020 | Bombaugh et al. | |
| 11,344,918 | B2 * | 5/2022 | Bombaugh | B07C 3/02 |
| 11,465,181 | B2 * | 10/2022 | Bombaugh | B07C 3/008 |
| 2003/0141226 | A1 | 7/2003 | Morikawa | |
| 2004/0007510 | A1 | 1/2004 | Kechel | |
| 2004/0049315 | A1 | 3/2004 | Sansone et al. | |
| 2004/0159592 | A1 | 8/2004 | McLaughlin et al. | |
| 2006/0037888 | A1 | 2/2006 | Wheeler et al. | |
| 2006/0283784 | A1 * | 12/2006 | Roth | B07C 3/00 209/584 |
| 2008/0011653 | A1 | 1/2008 | Stemmle | |
| 2008/0083662 | A1 | 4/2008 | Stemmle | |
| 2008/0087582 | A1 | 4/2008 | Zimmermann | |
| 2009/0230031 | A1 * | 9/2009 | Norris | B07C 3/06 209/584 |
| 2010/0025309 | A1 | 2/2010 | Burns et al. | |
| 2010/0286815 | A1 * | 11/2010 | Zimmermann | B07C 3/00 700/223 |
| 2011/0046775 | A1 | 2/2011 | Bailey et al. | |
| 2012/0095591 | A1 | 4/2012 | Wilson | |
| 2013/0035782 | A1 * | 2/2013 | Norris | B07C 3/00 700/223 |
| 2015/0224545 | A1 | 8/2015 | Bailey et al. | |
| 2018/0236495 | A1 * | 8/2018 | Berdelle-Hilge | B07C 3/08 |
| 2019/0105687 | A1 | 4/2019 | Bombaugh | |
| 2021/0086233 | A1 | 3/2021 | Bombaugh | |

FOREIGN PATENT DOCUMENTS

| | | | |
|---|---|---|---|
| EP | 1 872 866 | A2 | 1/2008 |
| EP | 2 226 130 | A1 | 9/2010 |
| FR | 2 647 425 | A1 | 11/1990 |
| WO | WO 2006/060529 | A1 | 6/2006 |

OTHER PUBLICATIONS

International Search Report and Written Opinion dated Sep. 19, 2017 for International Application No. PCT/US2017/031016.

* cited by examiner

SYSTEM AND METHOD OF SORTING AND SEQUENCING ITEMS

INCORPORATION BY REFERENCE OF PRIORITY APPLICATIONS

This application is a continuation of U.S. application Ser. No. 16/872,895, filed May 12, 2020, which is a continuation of U.S. application Ser. No. 16/252,445, filed Jan. 18, 2019, which is a continuation of U.S. patent application Ser. No. 15/727,866, which, in turn, is a divisional of U.S. patent application Ser. No. 14/941,373, filed Nov. 13, 2015, which claims the benefit of priority to U.S. Provisional Application 62/079,407, filed Nov. 13, 2014, which are hereby incorporated by reference in their entirety. Any and all applications for which a foreign or domestic priority claim is identified in the Application Data Sheet as filed with the present application are hereby incorporated by reference under 37 CFR 1.57.

BACKGROUND OF THE DEVELOPMENT

Field of the Development

The disclosure relates to the field of automatic feeding and sorting of items. More specifically, the present disclosure relates to systems and methods for sorting items into a specified sequence.

Description of the Related Art

Items, such as articles of mail, which can include letters, flats, parcels, and the like, are frequently received into a processing facility in bulk, and must be sorted into individual articles and sequenced into a desired order to facilitate further processes such as, for example, delivery of the item to a specified destination. Sorting and sequencing bulk stacks of items or articles can be done using sorting apparatuses. The sorting apparatuses and the bulk mail take up space in a processing facility, which may be at a premium.

SUMMARY

Some embodiments described herein include a system for sorting and sequencing items comprising a first sorter comprising: a first scanner configured to scan a plurality items and identify a destination for each of the plurality of items; a processor in communication with the first scanner, and configured to associate the identified destination for each of the plurality of items with one of a plurality of stop groups; and a sorting portion configured to receive items from the scanner, and sort the plurality of items into a plurality of bins according to the associated stop groups; a second sorter comprising: a second scanner configured to scan the plurality items and identify the destination for each of the plurality of items; a sorting portion configured to receive the plurality of items from the second scanner, the sorting portion including one or more lanes and a diverting member configured to divert the plurality of items into the one or more lanes; a processor in communication with the scanner, the processor configured to store a sequence of the destinations for the plurality of items, and to receive the associated stop group for each of the plurality of the items; wherein the processor is configured to control the diverting member to sort the plurality of items to one of the one or more lanes according to the stop group associated with each of the plurality of items; and an output sorter in communication with the processor, wherein the output sorter receives items from one of the one or more lanes and sorts the items from the one or more lanes into a plurality of output bins according to the stored sequence of destinations.

Some embodiments described herein include a method of sorting and sequencing items comprising assigning, in a processor, a plurality of delivery end points into a plurality of stop groups; sorting the plurality of items on a first sorting apparatus according to the assigned stop groups; placing the sorted items into trays according to the stop groups; loading the items from the trays according to a stop group order into a second sorting apparatus, the second sorting apparatus comprising at least a first lane and a second lane; sorting the items corresponding to a first one of the plurality of stop groups into the first lane; sorting the items corresponding to a second one of the one or more stop groups into the second lane; retrieving the items from the first lane and sorting the items to a plurality of output bins according to the delivery end points for the items from the first lane; and retrieving the items from the second lane and sorting the items from the second lane into the plurality of bins according to the delivery end points for the items from the second lane.

Some embodiments described herein relate to a system for sorting and sequencing items comprising a sorter comprising a first scanner configured to scan a plurality items and identify a destination for each of the plurality of items; a processor in communication with the first scanner, and configured to associate the identified destination for the for each of the plurality of items with one of a plurality of stop groups; and a sorting portion configured to receive items from the scanner, and sort the plurality of items into a plurality of bins according to the associated stop groups.

In some embodiments, the sorting portion comprises: one or more lanes; a dividing member configured to divert the items into one or more of the plurality of lanes; and an output sorter configured to selectively pick a leading item from one of the plurality of lines and direct the items toward the plurality of bins. In some embodiments, the processor is configured to store a sequence of the destinations for the plurality of items, and to receive the associated stop group for each of the plurality of the items, and to control the diverting member to sort the plurality of items to one of the one or more lanes according to the stop group associated for each of the plurality of items.

In some embodiments, the processor is in communication with the output sorter and is configured to direct the output sorter to sort the items from the one or more lanes into a plurality of output bins according to the stored sequence of destinations.

In some embodiments, the stored sequence of destinations is a walk sequence order.

In some embodiments, the output sorter is configured to sort items associated with one or more stop groups into one of the plurality of bins.

In some embodiments, the output sorter is configured to sort items originating from one stop group into one of the plurality of lanes.

In some embodiments, the output sorter is configured to sort items from one of the plurality of lanes into one of the plurality of bins in delivery sequence order.

Some embodiments described herein relate to a method of sorting and sequencing items comprising assigning, in a processor, a plurality of delivery end points into a plurality of stop groups; sorting the plurality of items on a sorting apparatus according to the assigned stop groups; moving the sorted items into one or more trays according to the stop groups; storing an association between the sorted items and the tray in which the sorted items are stored; moving the one or more trays into a storage location; and storing a location identifier for the one or more trays corresponding to a location of the one or more trays within the storage location. In some embodiments, the stop groups comprise delivery end points associated a plurality of delivery routes.

In some embodiments, the delivery end points assigned to one of the plurality of stop groups correspond to the first delivery end point from each of the plurality of delivery routes.

In some embodiments, the delivery end points are assigned to stop groups such that sorting the plurality of items according to the stop groups results in the items arranged in delivery sequence order.

In some embodiments, the method further comprises selecting one of the one or more trays according to a stop group order based on the stored association between the sorted items and the tray in which the sorted items are stored; loading the items from the selected one or more trays into the a second sorting apparatus, the second sorting apparatus comprising a pick belt, a dividing member, and at least a first lane and a second lane; sorting, using the pick belt and the dividing member, the items corresponding to a first one of the plurality of stop groups into the first lane and the items corresponding to a second one of the one or more stop groups into the second lane.

In some embodiments the method further comprises sorting the items from the first lane into a selected bins of a plurality of bins; and sorting the items from the second lane into the selected second plurality of bins.

In some embodiments, sorting the items from the first and second lanes into selected bins results in the items being sequenced in delivery sequence order.

In some embodiments, the method further comprises selecting another one of the one or more trays according to the stop group order based on the stored association between the sorted items and the tray in which the sorted items are stored.

In some embodiments, the method further comprises loading the items from another one of the selected one or more trays into the a second sorting apparatus; and sorting, using the pick belt and the dividing member, the items corresponding to a third one of the plurality of stop groups into one of the first and second lanes; and sorting, using the pick belt, the items corresponding to a fourth one of the one or more stop groups into the other of the first and second lanes.

In some embodiments, the method further comprises sorting the items from the another one of the one or more trays located in the first lane into the selected bins of the plurality of bins; and sorting the items the items from the another one of the one or more trays located in the second lane into the selected bins of the plurality of bins.

In some embodiments, sorting the items from the first and second lanes into selected bins results in the items being placed in the selected bins sequenced in delivery sequence order.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION OF EMBODIMENTS

Figure 1:
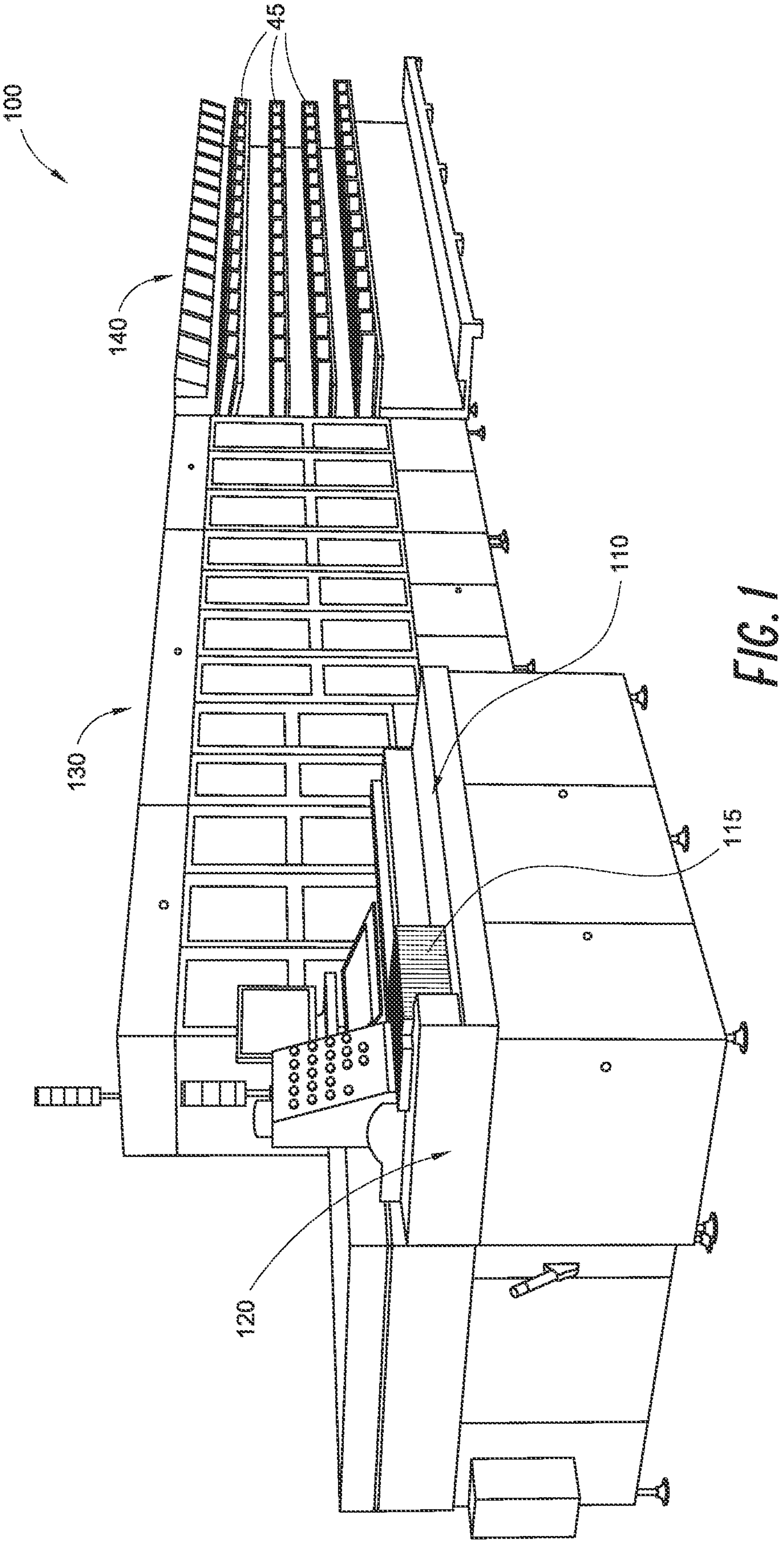
FIG. 1 is a perspective view of one embodiment of sorting/sequencing equipment.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The system described herein provides for faster and more efficient sorting and sequencing of bulk articles, such as, for example, articles of mail. The articles of mail for sorting may include items of various size and shape, such as letters, flats, and parcels. Articles of mail such as magazines and catalogs, which are too long in one direction to be considered a standard sized letter, are often called flats. Flats may be received in a processing facility in bulk, separate from letters or other articles of mail. The flats and letters are processed to sort and sequence the flats and letters into a desired sequence, such as in a delivery sequence order. The delivery sequence order can be the order in which a carrier navigates his or her delivery route, such as the order in which the carrier visits addresses along the carrier's delivery route. By using a combination of new machines and sorting methods, the footprint of items and machines can be reduced, machine run time can be optimized, and delivery resources can be used efficiently.

Although the present disclosure describes systems and devices for sorting and/or singulating articles of mail, such as letters and flats, it will be apparent to one of skill in the art that the disclosure presented herein is not limited thereto. For example, the development described herein may have application in a variety of manufacturing, assembly, distribution, or sorting applications.

As used herein, the term "stack" may mean a plurality of items, such as letters or flats, which have not been separated into individual pieces. A plurality of letters retrieved from a tray or bin can be loaded into a sorting machine as a stack. As used herein, the term singulation may mean the separation of a stack of articles into individual articles that move into a sorting or picking machine in a line of single articles. The term shingulation may mean the separation of articles from stack, but wherein the articles are not entirely separated from the other articles of the stack. Shingulated articles can partially overlap each other, similar to the overlapping pattern of shingles on a roof, and move into a sorting or picking machine in an overlapping, continuous line of articles. As used herein, a singulator may be capable of both singulation and shingulation of a stack of articles. The term motor is used herein to refer to any device which provides a mechanical or electrical motive force to a component of the processing equipment in a processing facility. The motors described herein may be mechanically or electrically driven, or may be a source of pneumatic or hydraulic pressure, or may be of any other types of motors.

A distribution network as described herein may comprise multiple levels. For example, a distribution network may comprise processing facilities such as regional distribution facilities, hubs, and unit delivery facilities, and other desired levels. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or with many unit delivery facilities, and can sort and deliver items to the unit delivery facilities with which it is associated. In the case of the United States Postal Service, the unit delivery facility may be associated with a ZIP code. The unit delivery facility receives items from local senders, and from hub level facilities or regional distribution facilities. The unit delivery facility also sorts and stages the items intended for delivery to destinations within the unit delivery facility's coverage area. The unit delivery facility may be associated with one or more delivery routes.

In a distribution network, items for delivery are brought into a processing facility. As used herein in, processing facility may refer to a regional distribution facility, a hub, or a unit delivery facility. In the processing facility, items are processed in preparation for the next stage in the delivery scheme. Incoming items into a processing facility may not be sorted or sequenced, and may be randomly ordered. Therefore, sorting and sequencing is required at the processing facility to sort and sequence items according to the next stage in the delivery scheme. Where the processing facility is a unit delivery facility, for example, the items must be sorted and sequenced into delivery routes and into delivery sequence order.

Items can be sorted according to item type, delivery end point, class of service, or any other criteria. Items which are intended for delivery within a defined geographic area near the processing facility, or intended for delivery to a particular destination or plurality of destinations, can be sorted by separating these items from items with other, different delivery end points. Items intended for delivery to a destination outside of the defined geographic area, particular destination or plurality of destinations can be processed and/or sent to another processing facility nearer their delivery end points.

Where items are intended for delivery within a defined geographic area or to a specific plurality of destinations, such as at a unit delivery facility, the items can be sequenced into a specific order, such as into delivery sequence order. A delivery sequence order can correlate to a particular delivery route which is serviced by a particular delivery resource, such as a carrier or vehicle. In this case, the delivery sequence order corresponds to the order in which delivery end points, such as addresses, are encountered as the delivery resource or carrier follows the particular delivery route. Where the items are mail pieces, the delivery sequence order corresponds to the addresses encountered as the mail carrier walks and/or drives his route. For example, the first house a carrier encounters on his delivery route may be assigned a delivery end point value of "1" The second house the carrier encounters on his delivery route may be assigned a delivery end point value of "2", and so on throughout the delivery route. In some embodiments, the delivery end point values may start at any number, and may increment by 1 as each subsequent delivery end point is encountered. Other values, such as alphanumeric codes and the like can be used for the delivery end point values.

A processing facility, such as a unit delivery facility, may service one or more delivery routes. In this case, sorting and sequencing items may be facilitated by assigning each delivery end point to a stop group as an intermediate step to sequencing according to delivery sequence order. A stop group is a group of one or more delivery end points that are grouped together for purposes of sorting and sequencing. For example, where a processing facility, such as a unit delivery facility, services 10 delivery routes, each delivery route having 10 delivery end points, a total of 100 delivery end points are serviced by the processing facility. The 100 delivery end points serviced by the processing facility are grouped into stop groups. A stop group can comprise a grouping of one or more of the 100 delivery end points. A stop group can be combination of delivery end points from one or more of the 10 delivery routes. Stop groups and their use will be described in greater detail below.

A processing facility can use automated processing equipment to sort items. Where the distribution network is the United States Postal Service (USPS), every day a processing facility receives a very high volume of items, such as letters and flats, which must be sorted and sequenced for delivery. Sorting and sequencing is accomplished using automated sorting equipment which can scan, read, or otherwise interpret a destination end point from each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the OCR'd address. In some embodiments, the automated sorting equipment can apply a computer readable code that encodes the delivery end point to the item. In some embodiments, the processing facility uses sorting/sequencing apparatuses which can process 30,000 items per hour. A typical USPS processing facility may also serve 200 or more delivery routes, each with multiple delivery end points. Because of the high volume of mail and the large number of delivery routes, the processing facility must use large equipment which may have a large footprint within the processing facility.

An example of sorting/sequencing equipment that may be used in some embodiments is depicted in FIG. 1. Sorter/sequencer 100 includes an intake system 110. The intake system 110 may be a counter or other receiving structure where a stack of items 115, such as letters, are brought to be fed into the sorter/sequencer 100. The intake system 110 may provide a surface or surfaces on which to place the stack of items 115 to stage the items for processing. The sorter/sequencer 100 system has a scanning portion 120 that includes a scanner (not shown) which scans or reads a computer readable code or performs OCR of an image of part or all of an item 115 in order to identify various characteristics of the item(s) 115, such as class of service, addressee, and/or delivery end point. The sorter/sequencer 100 includes a processor configured to control the operation of the sorter/sequence 100, including controlling the movement of items through the sorter/sequencer 100 via conveyor belts, pinch belts, and/or motors, controlling the scanning portion 120 to facilitate the intake, sorting, and sequencing the items 115. The processor is a memory in communication with the processor where information from the scanner is stored for further use. The memory can be part of the sorter/sequencer 100, or may be remote to the sorter/sequencer 100. The memory may be on a network with which the processor can communicate, and the memory may be shared by different components within a processing facility. The memory is configured to store the identity of each article processed, including information scanned, read, or interpreted from the letter, such as delivery end point, sender, class of service, postage, serial number, and the like. The memory is also configured to store the sequence of items in the item stream as they are scanned.

The sorter/sequencer 100 further includes a sorting portion 130. The sorting portion 130 may be a large storage and conveyor cabinet as shown, which has inside various components (not shown), for directing items 115 along particular pathways as the items 115 are sorted. The sorting portion 130 may be located adjacent to or otherwise near the intake system 120. In some embodiments, the items 115 may be moved or transported from the intake system 120 to the sorting portion 130 by an automated system including series of pinch belts, vacuum belts, or other conveying mechanisms. As the items are moved or transported from the intake system 120 to the sorting portion 130, the items are read or scanned, and destinations identified for each individual item 115. The processor then operates a system of motors, conveyors, and pinch belts to direct the item to the stacker portion 140.

The stacker portion 140 may be a structural system having a plurality of bins 145 arrayed, in some embodiments, in vertically disposed rows. Each bin 145 is configured to receive one or more items 115 from the sorting portion 130. Each bin 145 can be assigned to a particular delivery route or to one or more stop groups. This process will be described in greater detail below.

Where each bin 145 can be assigned to a delivery route, if the number of delivery routes is large, the number of bins 145 in the stacker portion 140 must also be large to contain the large number of bins 145. The present application describes systems and methods which reduce the number of bins 145 required on a sorter/sequencer 100, and thereby reduce the footprint of the sorter/sequencer 100.

The items from each bin 145 may be put into one or more trays using an automatic sweeper (not shown), which pushes items from each bin 145 into an adjacent tray. The trays used may be similar to those described in U.S. Application No. 62/058,407, filed Oct. 1, 2014, entitled TRANSFORMABLE TRAY AND TRAY SYSTEM FOR RECEIVING, TRANSPORTING AND UNLOADING ITEMS, the entire contents of which are hereby incorporated by reference.

Figure 2:
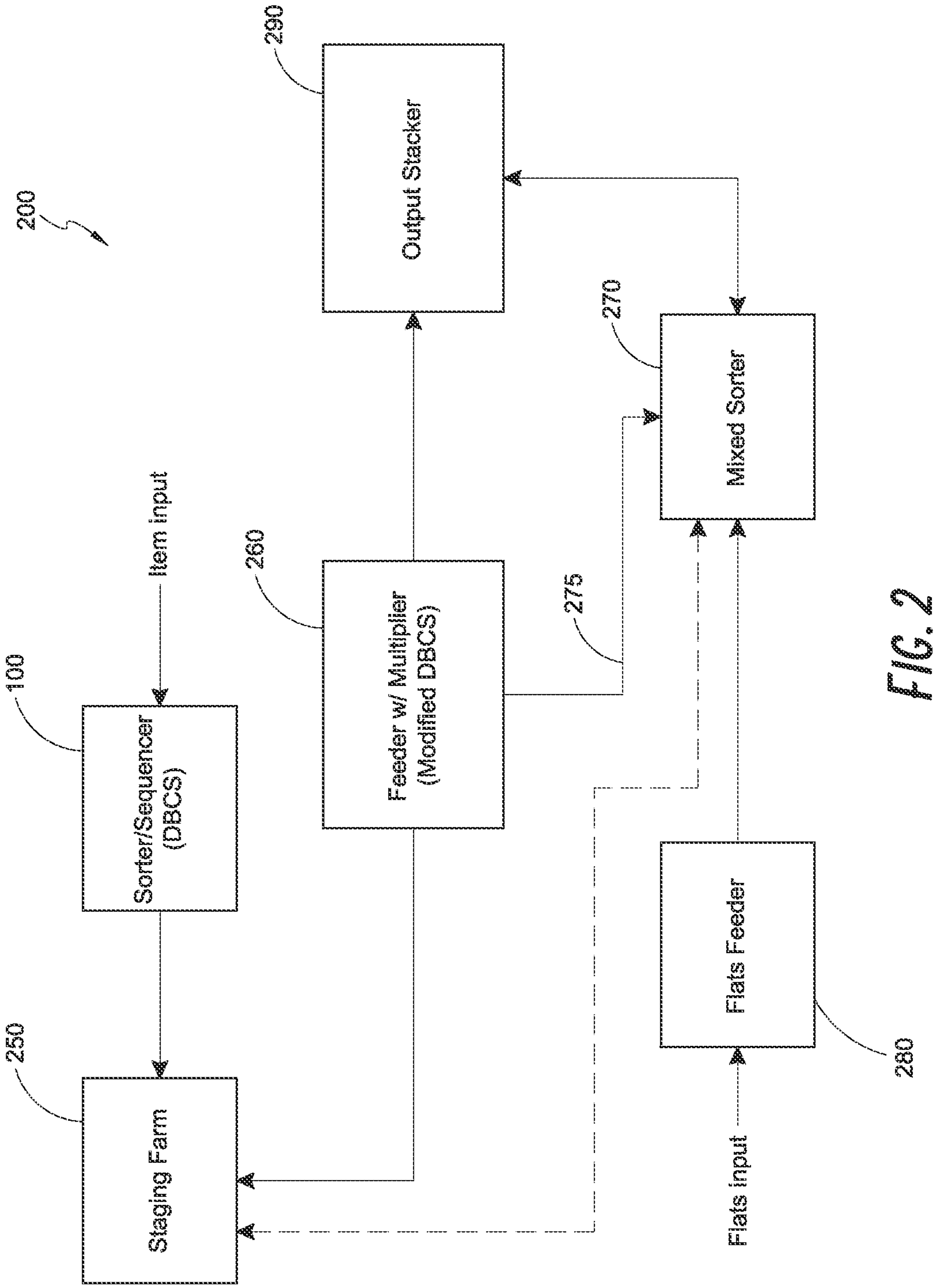
FIG. 2 is a diagram of an embodiment of a processing facility flow diagram.

FIG. 2 is a diagram of an embodiment of a process flow in a processing facility. Facility 200 can comprise a sorter/sequencer 100, a staging farm 250, a feeder with multiplier (modified sorter/sequencer) 260, a mixed sorter 270, a flats feeder 280, and an output stacker 290.

The sorter/sequencer 100 may be similar to that described with regard to FIG. 1.

The staging farm 250 includes storage space to store trays, items, pallets, bins, according to a staging plan. The staging farm can include automated storage and retrieval devices such as automated vehicles, cranes, and the like. In some embodiments, the staging farm 250 includes robotic vehicles, and robotic picking systems having overhead gantries, or the like. In some embodiments, the robotic picking system may be similar to the multipack robotic manufactured or sold by Cimcorp.

The mixed sorter 270 is described in greater detail below with FIG. 3.

The flats feeder 280 may be similar to those described in PCT application PCT/US2014/023300, filed Mar. 11, 2014, entitled SYSTEM AND METHOD OF AUTOMATIC FEEDER STACK MANAGEMENT, the entire contents of which are herein incorporated by reference.

The output stacker 290 can be part of the mixed sorter 270 and may include bins or stackers as described elsewhere herein. In some embodiments, such as when a mixed sorter 270 is not used, the output stacker 290 may be a portion of the modified sorter/sequencer 260. In some embodiments, the output stacker 290 may comprise a separate stacker or plurality of bins connected to the modified sorter/sequencer 260 and/or the mixed sorter 270 via conveyors or belts.

Figure 3:
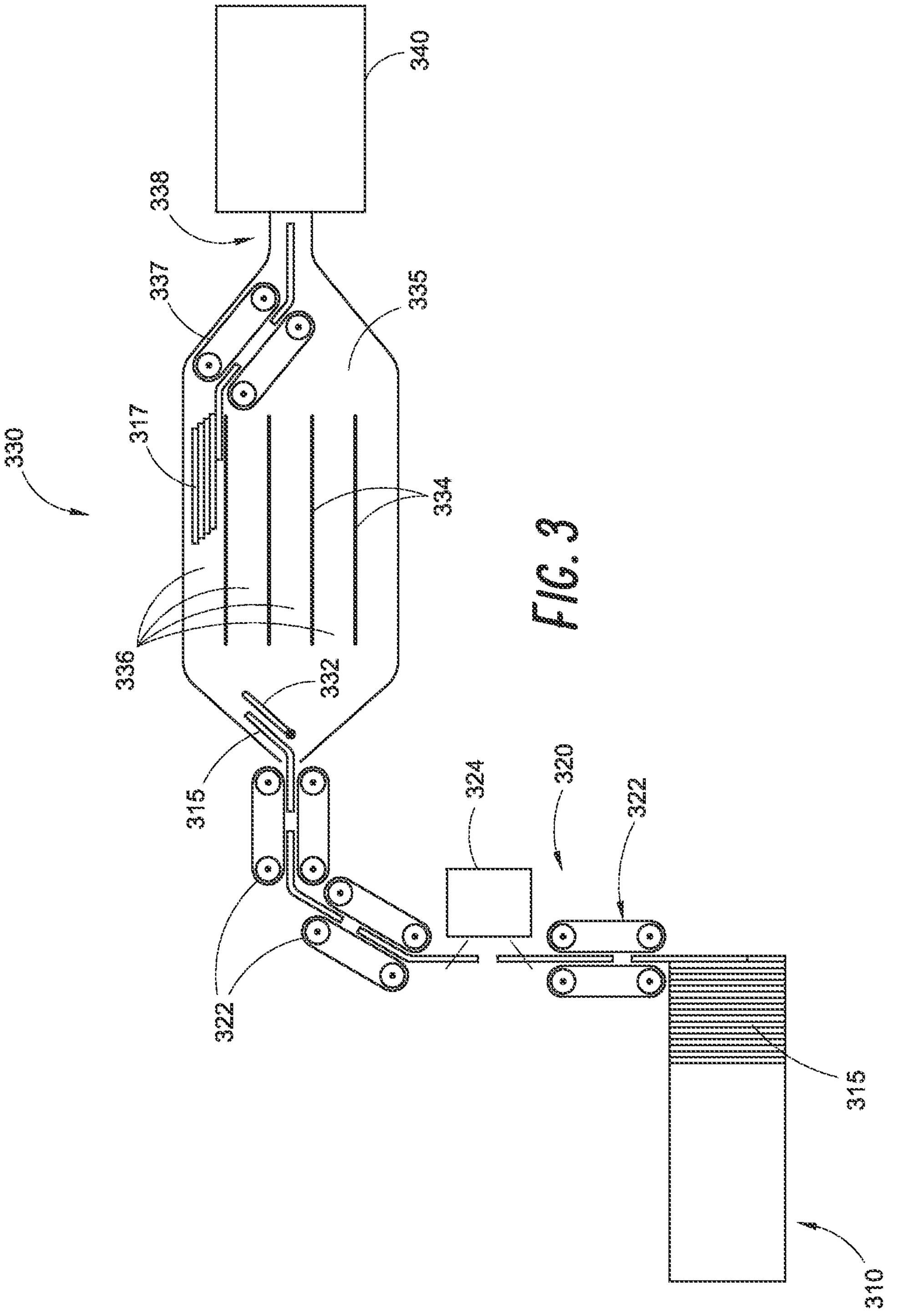
FIG. 3 depicts a top view of selected components of an embodiment of a modified sorter/sequencer.

FIG. 3 depicts a top view of selected components of a modified sorter/sequencer 260. A modified sorter/sequencer 260 includes an intake system 310. The intake system 310 receives a tray from the staging farm 250, which can be automatically unloaded into the intake system 310 as described in U.S. Application 62/058,407 referenced above. A stack of items 315 is moved into a scanning portion 320, which includes a plurality of pinch belts 322. The pinch belts 322 may be similar to those known in the art, which include a pair of belts which rotate on spindles powered by motors and which impart a momentum and direction to an item disposed between the pair of belts. The pinch belts 322 move the items 315, one at a time, past a scanner 324. The scanner is located downstream of the intake system 310, and along the path of the pinch belts 322. As the pinch belts 322, or in some embodiments, a single belt, move the item in front of the scanner, the scanner 324 scans each item 315 and determines a destination for each item 315 based on a computer readable code or on an OCR of the image of part or all of the item 315.

The plurality of pinch belts 322 move the item 315 along a path into a sorting portion 330. The sorting portion 330 may include a diverter member 332.

The diverter member 332 is pivotably connected to a motor controlled by a processor in communication with the scanner 324. The diverter member 332 is configured to receive items transmitted from pinch belts 322 and is moveable about an axis to divert items 315 into one of a plurality of lanes 336. As will be understood, the diverter member is not limited to the embodiment depicted in FIG. 3, but may be a component or components which can divert the items 315 into a selected lane 336 based on a signal from the processor.

The plurality of lanes 336 are formed by a plurality of lane dividers 334. The plurality of lane dividers extend from a base 335 and run generally parallel to each other. The lane dividers 334 can include pinch belts (not shown) in order to move the items into, along, and/or out of the lanes 336. In some embodiments, the plurality of lanes 336 may be arranged in one or more vertical columns, with the lane dividers 334 extending horizontally from a vertically oriented base 335. Although described herein as an output belt 337, items received from the lanes 336 may be processed by mechanisms and components other than a belt which are known in the art. The sorting portion 330 is configured such that a shingulated stack 317 of items 315 can accrue in each lane 336. The accruing stacks 317 can also be referred to as buffers. The lanes 336 are connected at their output ends to one or more output belts 337 which receive the shingulated stack 317 from the associated lanes 336, and move or transport the items 315 from the shingulated stacks 317 of articles into a stacker portion 340. In some embodiments, the output belts 337 move or transport the items 315 to a direct connect line 275 (shown in FIG. 2) which directly conveys the articles 315 from the lane 336 to the mixed sorter 270. The output belt 337 is adapted to move such that it can selectively choose, under the control of a processor and memory, an item from any one of the lanes 336, such as the leading item in each of the lanes 336, in order to generate an output item stream or line 338 sorted in a desired delivery sequence order. The operation of the modified sorter/sequencer 260 will be described in greater detail below.

The processor of the modified sorter/sequencer 260 stores the scanned or read information for each item 315 in a memory. The memory can be local to the modified sorter/sequencer 260, or can be a memory described elsewhere herein. The processor stores in memory the destination end point for each item 315 in the order in which it was processed. The processor also stores in memory which lane 336 the item was routed.

In some embodiments, the modified sorter/sequencer 260 may be similar to the product called the Shingled Letter Sequencer (SLS) manufactured or sold by Selex ES S.p.A. or its affiliates.

As a brief overview of the operations of the processing facility 200 items 115, such as letters, are received into a processing facility 200, as item input. The items 115 are received into the sorter/sequencer 100. The sorter/sequencer 100 performs a first pass sorting according to criteria set in the processor, such as according to stop group or delivery route, of the sorter/sequencer 100. The items 115 are sorted according to the criteria and stored in one or more bins 145 in the stacker portion 140. The items 115 can be removed from the bins 145 and be swept, via an automated arm, robot, or mechanical means, or otherwise put into trays. As used herein, a tray can refer to a specific type of tray adapted for use with a sorter/sequencer 100 described herein, or can be any other type of container capable of receiving and containing a plurality of items.

The trays are moved from the sorter/sequencer 100 to the staging farm 250 to await a second sorting pass. The trays may be moved using a robotic tray handling system from the staging farm 250. The tray handling system can move the trays along the paths between components depicted in FIG. 2. The trays may comprise computer readable identifiers provided to track the contents of the trays and to store the location of the tray within the storage farm in the memory. This allows specific trays to be retrieved by an automated system as required for a second or additional sorting pass. The identifiers may include information indicating the bin 145 from which the items were taken and the location of trays in the staging farm. The tray handling system includes a processor (not illustrated) and a memory (not illustrated) to track the contents and location of each tray for efficient storage in and retrieval from the staging farm 250.

Trays are obtained by the tray handling system from the staging farm in a particular order or sequence, as required, as will be described in greater detail below, and are fed into a modified sorter/sequencer 260. The modified sorter/sequencer 260 may be similar to the sorter/sequencer 100.

Once items are processed through the modified sorter/sequencer 260, the items can be transported to a mixed sorter 270 via direct connect 275. In some embodiments, the items 315 can be transported to an output stacker 290 in delivery sequence order, ready for delivery. In some embodiments, the output stacker 290 may be the stacker portion 340 of the modified sorter/sequencer 260.

The direct connect 275 can be a conveyor or series of pinch belts which transport the items 315, either in a singulated or shingulated format to the mixed sorter 270. The items 315 may be transported to the mixed sorter 270 where a second category of items, such as flats, can be introduced into the item sequences.

The flats can be received into the processing facility separate from items 115, 315, which may include only items such as letters. Thus, flats may be desirably sorted separately from letters. In some embodiments, the flats are received as flats input, and are processed in a flats feeder 280.

The flats feeder 280 feeds flats to the mixed sorter 270, where the flats undergo a first pass in which they are sorted and/or sequenced according to a criteria such as delivery end point or stop group. The flats can be transported to staging farm 250 in trays similar to those described elsewhere herein.

The mixed mail sorter 270 receives items 115, 315 from the direct connect 275, and receives flats from the staging farm 250, and combines the two streams of articles into delivery sequence order, and outputs a single, combined stream into the output stacker 290. In some embodiments, the output stacker 290 may comprise a plurality of bins 145 corresponding to delivery routes.

The process of sequencing articles in the processing facility 200 will now be described with reference to FIGS. 2 and 4. A two-pass sorting system can be used advantageously to reduce the size of processing equipment in a processing facility, to reduce equipment run-time and operating expense, and generally to use more efficiently the processing equipment. The process of sorting and sequencing mail will be described with regard to FIG. 2. The USPS will be used as an example to describe the process of sequencing articles, but the present disclosure is not limited thereto.

A tray, pallet, bin, sack, or other bulk collection of items, for example, items, is received in the processing facility 200. The processing facility may be a USPS unit delivery facility which, for example, services 4 delivery routes, each of which includes 8 delivery end points, or addresses, for a total of 32 destinations. These numbers are exemplary only, and the scope of the present disclosure is not limited thereto.

An initial sorting of the items is performed, which sorts or divides the items into stop groups. In the USPS example, the 32 delivery end points, or addresses, are divided into 8 stop groups. The stop groups do not and need not necessarily correspond to the delivery routes. FIG. 4 is a diagram showing an exemplary division of 32 destinations into stop groups (G1-G8), delivery routes, and delivery end points. Each number 1 through 32, corresponds to a destination, and the destinations are ordered in delivery order sequence. Each numbered delivery end point can represent one item or item intended for delivery to a particular destination, or may represent more than one item for delivery to the particular destination. For example, delivery end point 2 in FIG. 4 may indicate that there is one, or more than one item intended for delivery to delivery end point 2.

G1 through G8 indicate stop groups, and stackers 1 through 4 indicate physical bins 145 into which items corresponding to delivery end points 1 through 32 are placed after passing through the sorting equipment.

Figure 4:
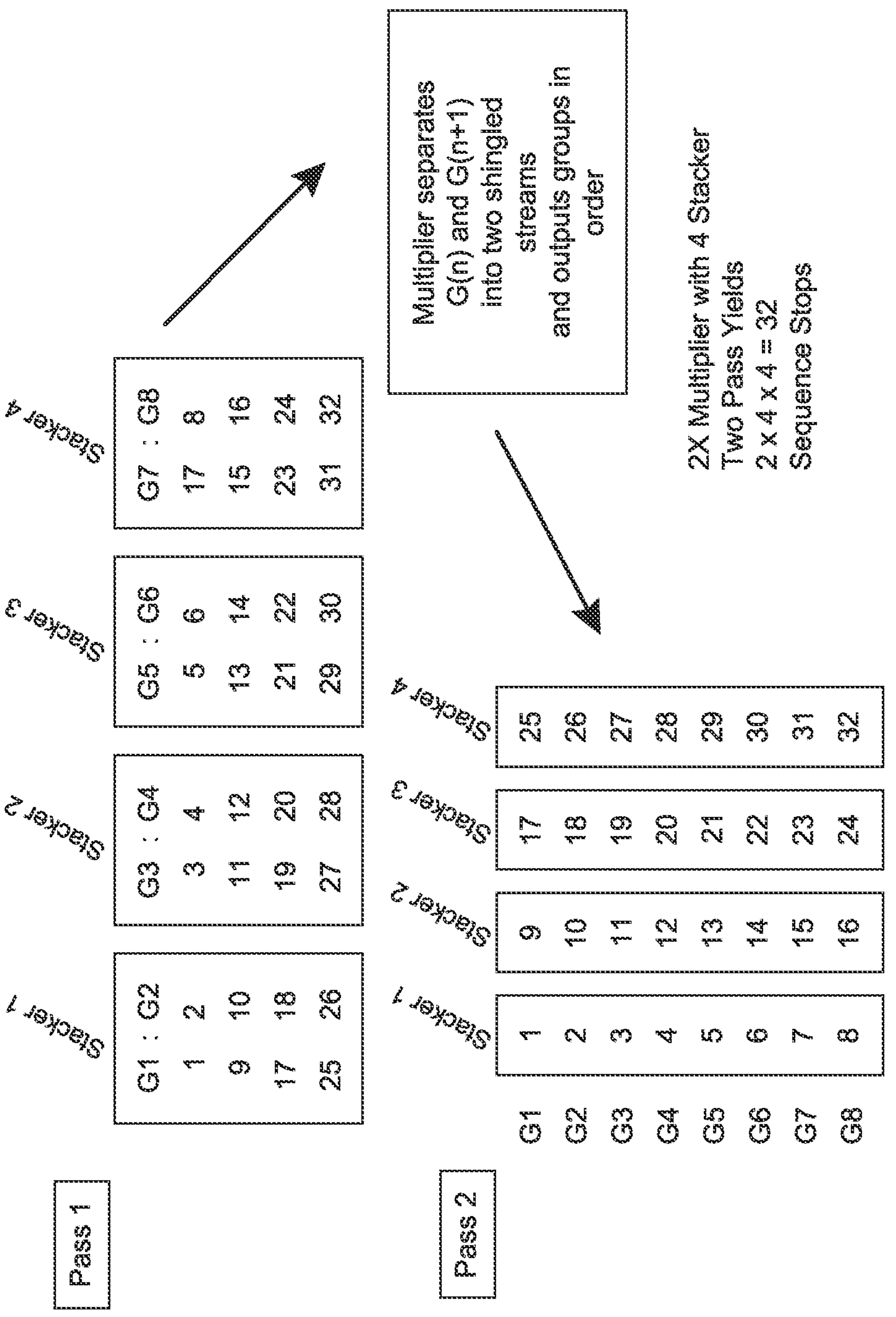
FIG. 4 depicts an embodiment of a two-pass sorting process.

FIG. 4 shows an exemplary division of delivery end points into stop groups. Stop group G1 includes destinations 1, 9, 17, and 25; stop group G2 includes destinations 2, 10, 18, 26, stop group G3 includes destinations 3, 11, 19, and 27, etc., up through stop group G8, which includes destinations 8, 16, 24, and 32. Stop group G1 includes the destinations which are the lowest numbered, or first, destination (e.g., 1, 9, 17, and 25) for each delivery route, which corresponds to the stackers in pass 2. Stop group G2 includes the destinations which are the next sequential number, or second destination (e.g. 2, 10, 18, 26), in each pass 2 stacker (and delivery route), and so on, up through stop group G8. As will be described below, because stop group G1 corresponds to the first destination in each delivery route, the shingulated stack 317 of items can be sorted to a corresponding stacker, based on the known sequence of items in the first lane 336. Thus, by processing the items in the shingulated stack 317 in the first lane, items intended for delivery to the lowest numbered destination in each stacker are moved into the corresponding stacker (bin 145) 1 through 4. In some embodiments, the delivery end points can be assigned to stop groups such that the highest numbered delivery end points are assigned to stop group 1, the next lowest numbered delivery end points are assigned to stop group 2, etc. A person of skill in the art, guided by this disclosure, would understand that other divisions of delivery end points into stop groups are possible.

As described above, sorter/sequencer 100 comprises a stacker portion 140 which has a plurality of bins 145 into which items are sorted. In the present example, the sorter/sequencer 100 assigns 4 bins 145 of the stacker portion 140 to receive items. The bins 145 may be interchangeably referred to as stackers. In the sorter/sequencer 100, stop groups G1 and G2 are assigned to be sorted into stacker 1, stop groups G3 and G4 are assigned to be sorted into stacker 2, stop groups G5 and G6 are assigned to be sorted into stacker 3, and stop groups G7 and G8 are assigned to be sorted into stacker 4.

In pass 1, the items are fed into the sorter/stacker 100 in the random order in which the items were received in bulk. The scanning portion 120 receives the items and scans a destination delivery code, such as a barcode, or reads an address from a item using OCR, and identifies the delivery end point for that item. The processor compares the delivery end point for that item to a sorting plan stored in memory. The sorting plan can include the number of stop groups for the processing facility, the division of delivery end points into stop groups, the delivery routes, and any other desired information. The processor determines which stop group the scanned item belongs to, and routes the item to the appropriate stacker. For example, if the item scanned in the scanning portion 120 is intended for delivery to destination 9, the item is routed in the sorter/sequencer 100 to stacker 1. When the bulk stack of items has been fully sorted, stackers 1 through 4 will contain items according to the stop groups assigned to each stacker. The items in the stackers (bins 145) will not necessarily be ordered according to ascending or descending delivery sequence. In some embodiments, the items will be randomly arranged within the stacker, but each stacker will contain only items belonging to the assigned stop groups.

Once the items have all been sorted with a first pass, the stackers are swept or emptied into trays. The trays may be automatically or manually removed to the storage farm 250. In some embodiments, the trays will each have a computer readable code thereon or associated therewith. When the stacker contents are loaded into a tray, an automated unloading system may read or scan a computer readable code on the tray and/or on the bin 145. This scan event can be stored in a memory to correlate the contents of the tray with the stacker from which the items were taken. This enables the automation of the next pass as will be described below.

Referring again to FIG. 2, the trays can be taken or transported to the staging farm 250. The location of each particular tray is stored in a memory, so it can be easily determined where in the storage farm 250 each tray is located. This way, the trays can be retrieved for pass 2 in stop group order, as will be described below.

In some embodiments, the automated stacker unloading and transportation equipment may include a location awareness system which logs an event when each tray is loaded and records the location of each tray in the storage farm. For example, when the automated unloading equipment sweeps the items from stacker 1, an event is logged to identify the tray which contains the items from stacker 1. The tray is moved to a location in the storage farm 250, and another event is logged, and the location of the tray having the contents of stacker 1 is recorded for later use.

The items now need to be sorted and sequenced in pass 2, which will sequence the items into delivery sequence order. The trays are retrieved from the storage farm 250 in stop group order. This means that the tray from stacker 1 is retrieved and processed on the modified sorter/sequencer 260 first. Because time may elapse between pass 1 and pass 2, the locations of the trays is stored and recorded in memory, so the trays can be retrieved and processed for pass 2 in stop group order.

The tray containing the items taken from stacker 1 in pass 1 are loaded into the modified sorter/sequencer 260 and pass 2 commences. As noted above, the modified sorter/sequencer 260 may also comprise a stacking portion 340 which is similar to stacker portion 140. In some embodiments, each stacker 1 through 4 of pass 2 may receive items intended for a specific delivery route, although this need not necessarily be so. For example, a first delivery route can include destinations 1-8, the second delivery route includes destinations 9-16, etc. In some embodiments, the first delivery route may correspond to more or less than destinations 1-8 without departing from the scope of the present disclosure. In pass 2, the stackers are assigned to a delivery route, or to a sequential group of destinations. As shown in FIG. 4, stackers 1 through 4 of pass 2 are assigned to sequential groups of eight destinations. Stacker 1 is designated to receive items for destinations 1-8, etc.

As the items are moved past the scanner 324 by pinch belts 322, each item is scanned, and a computer readable code is read or an OCR image is analyzed to identify the delivery end point for the item. Based on the destination, the item is moved into a particular one of the multiplier lanes 336, where it is put into a shingulated stack 317. In this example, two lanes 336 of a multiplier are used. As additional items are scanned, they are routed to multiplier lanes 336 according to their destinations. The lanes 336 act as buffers to temporarily store items for as they are sorted and received for subsequent sequencing into delivery sequence order. For example, if the first item from stacker 1 is intended for destination 1, the item is moved into a first lane 336 by the diverter 332, and is held in the buffer, awaiting scanning and sorting of all items from stacker 1 of pass 1, and final separation by the output belt 337. If the next item from stacker 2 is intended for destination 2, the diverter 332 diverts the item into a second lane 336, where it is held in the buffer. In this embodiment, all items intended for odd numbered destinations are routed to the first lane 336 and shingulated in the buffer into the shingulated stack 317, and all items intended for even numbered destinations are routed to the second land 336.

In some embodiments, the items assigned to delivery end points of stop group G1 are routed to the first lane 336, and items assigned to delivery end points of stop group G2 are routed to the second lane 336. For example, where a stacker from pass 1 containing items for 2 stop groups G1 and G2 is fed into the modified sorter/sequencer 260, the processor scans the item and determines which to which stop group the item belongs. Items belonging to stop group G1 are routed to the first lane 336, and items belonging to stop group G2 are routed to the second lane. The memory associates each item with the corresponding delivery end point (e.g., destination 1-32) for each item as they move into the lanes 336. Thus, the processor can determine in which delivery sequence the items in the shingulated stack 317 in the first lane 3336 are arranged.

After all the items from stacker 1 have been fed into the first and second lane 336 and are being held in the buffer, the items from the first lane 336, or those which belong to stop group G1 are moved out of the multiplier lane 336 and are sorted into the stacker portion 340 via the output belt 337. Because the memory has stored the delivery end point order for the items in the first lane 336, the output belt 337 can selectively pick the leading item in the shingulated stack 317 and route that item to the appropriate stacker in the modified sorter/sequencer 260.

As shown in FIG. 4, for pass 2, stacker 1 corresponds to delivery end points 1-8, stacker 2 corresponds to delivery end points 9-16, etc. Each of stacker 1-4 of pass two may correspond to a single delivery route.

After the shingulated stack 317 in the first lane 336, which includes items for destinations in stop group G1, the shingulated stack 317 in the second lane 336 is processed based on the known sequence in the second lane 336. Processing the second stop group G2 routes the items intended for delivery to the second lowest numbered destinations into each stacker 1 through 4.

After the items from stacker 1 of pass 1 is sorted and sequenced, stacker 2 from pass 1, which includes items from stop groups G3 and G4 is loaded into the modified sorter/sequencer 260, and the process repeats, with stop group G3 items placed into the buffer in the first lane 336 and stop group G4 items placed into the buffer in the second lane 336.

This process is repeated until all the stackers from pass 1 have been processed. The end result is pass 2 stackers 1-4 which hold items sequenced in delivery sequence order. The items stackers 1-4 from pass 2 can be passed along to delivery resources, such as carriers for delivery.

As shown in FIG. 4, by using the described two-pass sorting scheme, items for 32 delivery end points and four delivery routes can be processed using 4 stackers. In an existing sorting scheme, sequencing items to 32 delivery end points would require 8 stackers for pass 1 and 8 stackers for pass two. As the number of lanes 336 in the modified sorter/sequencer 260 is increased, the number of stackers required to sort items into delivery sequence order can be reduced. For example, in a typical processing facility, a sorter/sequencer 100 may have 200 bins 145 (or stackers) in a stacking portion 140/340. By coupling the sorter/sequencer 100 with a modified sorter/sequencer 260 having five lanes 336 in a multiplier, the number of bins 145 (or stackers) required can be reduced to 40. This results in a significant savings in space and in machine availability.

In some embodiments, the distribution network may also desire to incorporate flats into the delivery sequence. Due to the difference in size and rigidity of flats, not all sorting equipment can process both multiple item types, such as letters and flats. In the exemplary embodiment described above, the sorter/sequencer 100 did not process letters, flats. However, a person of skill in the art will understand that the sorting and sequencing equipment described above can process both letters and flats without departing from the scope of the invention.

In a situation where the processing facility 200 has equipment which can only process letters, and not flats, an additional flats stream can be implemented to incorporate flats intended for the delivery end points 1 through 32 into the delivery sequence order from the modified sorter/sequencer 260. Referring again to FIG. 2, flats can be received into a processing facility in bulk, such as in totes, bins, trays, on pallets, and the like. The flats are shingulated or singulated into a stream as by flats feeder 200 described elsewhere herein. The flats feeder feeds a singulated or shingulated stream of flats into the mixed sorter 270. The mixed sorter 270 has the ability to process both letters and flats, and can be similar to the XMS™ equipment manufactured or sold by Solystic.

The flats are processed on the mixed sorter 270 into delivery sequence order. The flats can then be put in trays and stored in the staging farm 250 as described elsewhere herein. The flats can then be returned to the intake of the mixed sorter 270 to await inclusion into the letter feed. The letter feed may come from trays from the output stacker 290, or may come to the mixed sorter 270 via the direct connect 275.

The letters from the direct connect 275 or the output stacker are already in delivery sequence order. As the letters are fed into the mixed sorter 270, the letters are scanned and the destination is identified. The first destination identified should be destination 1, based on the two-pass sorting system described above. As the mixed sorter 270 processes the letters for destination 1, any flats intended for delivery to destination 1 are pulled from the flats stream and are inserted into the letter stream at the appropriate point for each delivery end point, forming a combined mail stream. This process continues, merging the letter stream and the flats stream into a combined mail stream for each delivery end point. The mixed sorter 270 outputs letters and flats in delivery sequence order to the output stacker 290.

Because flats tend to be larger than letters, flats can be useful as destination dividers for the carriers. This can be accomplished by processing all the letters for one delivery end point first, and then adding the flats for that delivery end point after the letters. In this way, the items for each delivery end point will be delineated by the flats, which mark the end of the items for each delivery end point.

In some embodiments, the flats for a delivery end point can be sequenced to follow the letters for the delivery end point based on the scan of the letters. For example, the mixed sorter 270 may scan the letters, and determine the delivery end point for each letter. Thus, when the mixed sorter 270 scans a letter for the next sequential delivery end point, a flat can be inserted into the mixed mail stream before the letter for the next sequential delivery end point is pulled into the mixed mail stream.

In some embodiments, the flats for a delivery end point can be sequenced to follow the letters for the delivery end point based on the known number of letters for each delivery end point. After pass 2 through the modified sorter/sequencer 260, the sequence of letters and the number of letters intended for each destination is known. For example, as the letters move through the modified sorter/sequencer

260, the scanning portion 320 scans each letter, and counts how many letters are intended for each destination. This information can be stored in a memory accessible by the equipment in the processing facility 200. When the letters are fed into the mixed sorter 270, the mixed mail sorter 270 can count the number of letters intended for a delivery end point, and once the known number of letters for the delivery end point have been counted, the flats intended for the same delivery end point are pulled into and merged with the letter stream.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

A processor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of sorting and sequencing items comprising:
- creating, in a processor, a sort plan for sorting a plurality of items for delivery to a plurality of delivery end points;
- assigning, in a processor, a plurality of delivery end points to a plurality of stop groups based on the sort plan;
- sorting, in a first pass, the plurality of items on a sorting apparatus according to the assigned stop groups to a plurality of sort destinations;
- moving the sorted items from the plurality of sort destinations into a plurality of trays according to the stop groups;
- moving the plurality of trays containing the sorted items to a staging farm;
- storing, in a memory, an association between the sorted items, an individual tray of the plurality of trays in which at least a portion of the sorted items are located, and a location within the staging farm where the individual tray is stored;
- identifying, based on the sort plan, a subset of the plurality of trays for sorting in the sorting apparatus;
- retrieving the subset of the plurality of trays from their locations in the staging farm;
- moving the subset of the plurality of trays to the sorting apparatus; and
- sorting, in a second pass, the items from the subset of the plurality of trays on the sorting apparatus into individual sort destinations of the plurality of sort destinations.

2. The method of claim 1, wherein the subset of the plurality of items are sorted in the second pass into a delivery sequence order within individual stop groups of the plurality of stop groups.

3. The method of claim 1, wherein storing the association comprises storing an identifier of a computer-readable code located on the individual tray or at the location within the staging farm where the individual tray is stored.

4. The method of claim 1, wherein one or more automated storage and retrieval devices move the plurality of trays to the staging farm and to the sorting apparatus.

5. The method of claim 4, wherein the one or more automated storage and retrieval devices comprise one or more robotic vehicles.

6. The method of claim 1, wherein the subset of the plurality of trays are selected for retrieval according to a stop group order in the sort plan.

7. The method of claim 6, further comprising, after moving the subset of the plurality of trays to the sorting apparatus, loading the items from the subset of the plurality of trays into the sorting apparatus according to the stop group order.

8. The method of claim 1, wherein the stop groups comprise delivery end points associated with a plurality of delivery routes.

9. The method of claim 8, wherein the delivery end points assigned to one of the plurality of stop groups correspond to the first delivery end point from each of the plurality of delivery routes.

10. The method of claim 1, wherein the subset of the plurality of items are items of a first type, and wherein a plurality of items of a second type are combined with the subset of the plurality of items in the second sorting pass.

11. A system for sorting and sequencing items comprising:

a sorting apparatus having a plurality of sort destinations;

a staging farm; and one or more processors configured to:

create a sort plan for sorting a plurality of items for delivery to a plurality of delivery end points;

assign a plurality of delivery end points to a plurality of stop groups based on the sort plan;

cause the sorting apparatus to sort, in a first pass, the plurality of items according to the assigned stop groups into a plurality of trays;

cause movement of the plurality of trays containing the sorted items to the staging farm;

store, in a memory, an association between the sorted items, an individual tray of the plurality of trays in which the sorted items are stored, and a location within the staging farm where the individual tray is stored;

identify, based on the sort plan, a subset of the plurality of trays for sorting in the sorting apparatus;

cause retrieval of the subset of the plurality of trays from their locations in the staging farm;

cause movement of the subset of the plurality of trays to the sorting apparatus; and cause the sorting apparatus to sort, in a second pass, the items of the subset of the plurality of trays on the sorting apparatus into individual sort destinations of the plurality of sort destinations.

12. The system of claim 11, wherein, in the second pass, the sorting apparatus sorts the subset of the plurality of items into a delivery sequence order within individual stop groups of the plurality of stop groups.

13. The system of claim 11, wherein storing the association comprises storing an identifier of a computer-readable code located on the individual tray or at the location within the staging farm where the individual tray is stored.

14. The system of claim 11, further comprising one or more automated storage and retrieval devices configured to move the plurality of trays to the staging farm and to the sorting apparatus under control of the one or more processors.

15. The system of claim 14, wherein the one or more automated storage and retrieval devices comprise one or more robotic vehicles.

16. The system of claim 11, wherein the one or more processors are configured to identify, based on the sort plan, a subset of the plurality of trays for sorting in the sorting apparatus according to a stop group order.

17. The system of claim 16, wherein the one or more processors are further configured to cause the subset of the plurality of items to be loaded into the sorting apparatus according to the stop group order after the subset of the plurality of trays are moved to the sorting apparatus.

18. The system of claim 11, wherein the stop groups comprise delivery end points associated with a plurality of delivery routes.

19. The system of claim 18, wherein the delivery end points assigned to one of the plurality of stop groups correspond to the first delivery end point from each of the plurality of delivery routes.

20. The system of claim 11, wherein the subset of the plurality of items are items of a first type, and wherein the sorting apparatus combines a plurality of items of a second type with the items from the subset of the plurality of trays in the second sorting pass.

* * * * *